US008668798B2

(12) United States Patent
Cooper et al.

(10) Patent No.: US 8,668,798 B2
(45) Date of Patent: Mar. 11, 2014

(54) NON-TOXIC WATER-BASED FRIT SLURRY PASTE, AND ASSEMBLY INCORPORATING THE SAME

(75) Inventors: David J. Cooper, Canton, OH (US); Timothy Alan Dennis, Bloomdale, OH (US)

(73) Assignee: Guardian Industries Corp., Auburn Hills, MI (US)

( * ) Notice: Subject to any disclaimer, the term of this patent is extended or adjusted under 35 U.S.C. 154(b) by 551 days.

(21) Appl. No.: 12/458,071

(22) Filed: Jun. 30, 2009

(65) Prior Publication Data

US 2010/0330308 A1 Dec. 30, 2010

(51) Int. Cl.
*C03B 29/00* (2006.01)
*B29C 65/00* (2006.01)
*C03C 27/00* (2006.01)

(52) U.S. Cl.
USPC ........... 156/89.11; 156/60; 156/107; 156/109

(58) Field of Classification Search
USPC ...................................... 156/89.11, 107, 109
See application file for complete search history.

(56) References Cited

U.S. PATENT DOCUMENTS

| 4,482,579 A * | 11/1984 | Fujii et al. ........................ 427/64 |
| 5,657,607 A * | 8/1997 | Collins et al. ............... 52/786.13 |
| 5,664,395 A | 9/1997 | Collins et al. |
| 5,902,652 A | 5/1999 | Collins et al. |
| 6,365,242 B1 * | 4/2002 | Veerasamy ..................... 428/34 |
| 6,701,749 B2 * | 3/2004 | Wang et al. ....................... 65/41 |
| 6,998,776 B2 * | 2/2006 | Aitken et al. ................. 313/512 |
| 8,257,130 B2 * | 9/2012 | Ito et al. ........................... 445/25 |
| 2007/0195634 A1 * | 8/2007 | Lee ........................... 365/230.05 |

FOREIGN PATENT DOCUMENTS

| EP | 0 889 010 | 1/1999 |
| SU | 1 578 093 | 7/1990 |
| WO | WO 96/22255 | 7/1996 |
| WO | WO 9622255 A1 * | 7/1996 |

* cited by examiner

*Primary Examiner* — Philip Tucker
*Assistant Examiner* — Alex Efta
(74) *Attorney, Agent, or Firm* — Nixon & Vanderhye P.C.

(57) ABSTRACT

Certain example embodiments of this invention relate to a frit slurry paste for use in assemblies (e.g., a vacuum insulated glass unit or a plasma display panel), and methods of making the same. Frit powder, binder material, and a water-based solvent are mixed together to form an intermediate mixture. The frit powder is substantially lead free, and the water-based solvent is provided at a first temperature. Additional water-based solvent is added to the intermediate mixture to form a frit slurry paste. The additional water-based solvent is provided at a second temperature, with the second temperature being lower than the first temperature. The binder material is provided at a concentration of 0.001%-20% by weight with respect to the frit slurry paste or the frit slurry paste absent the frit powder. The frit slurry paste has a bulk viscosity of 2,000-200,000 cps.

15 Claims, 5 Drawing Sheets

NON-TOXIC WATER-BASED FRIT SLURRY PASTE, AND ASSEMBLY INCORPORATING THE SAME

FIELD OF THE INVENTION

Certain example embodiments of this invention relate to a water-inclusive vehicle system (e.g., solvent and binder) for use with "lead-free" glass powders in making frits. More particularly, certain example embodiments of this invention relate to a slurry paste mixture comprising a non-toxic ceramic or glassy powder and a binder and solvent for use in an assembly (e.g., a vacuum insulated glass unit or a plasma display panel), and/or an assembly incorporating the same.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess II retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated (typically using a convection oven) to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventors Lenzen, Turner and Collins of the '395 patent have stated that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Unfortunately, the aforesaid high temperatures and long heating times of the entire assembly utilized in the formulation of edge seal 4 are undesirable, especially when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered sheet when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

Even when non-tempered glass substrates are used, the high temperatures applied to the entire VIG assembly may soften the glass or introduce stresses, and partial heating may introduce more stress. These stresses may increase the likelihood of deformation of the glass and/or breakage.

Moreover, the ceramic or solder glass edge seals of conventional VIG units tend to be brittle and prone to cracking and/or breakage, reducing the ability of individual glass panels to move relative to one another. Glass panel movement is known to occur under normal conditions such as, for example, when two hermetically sealed glass components (such as in a VIG unit) are installed as a component of a window, skylight or door, whereby the VIG unit is exposed to direct sunlight and one glass panel has higher thermal absorption than the other panel or there is a great difference between the interior and exterior temperatures.

Currently, most frit slurry mixtures used in vacuum insulated glass (VIG) or plasma display panel (PDP) applications include organic solvents and binders, along with lead-borne ceramic powders that may be harmful to the environment and toxic to humans and/or other organisms. The base frits often contain large amounts of lead, most typically in the form of PbO. Additionally, most current frit slurry mixtures include hydrocarbon solvents, which present a number of environmental issues. The desire for a "lead-free" frit also is increasing, as some relevant rules and regulations are directed to the reduction and sometimes even complete banning of lead-based materials, e.g., in window applications.

Thus, it will be appreciated that there is a need in the art for a frit slurry mixture that is non-toxic and still capable of performing the desired or necessary functions of the potentially harmful slurry mixtures, and/or assemblies including the same.

In this regard, it will be appreciated that the use of water as a solvent reduces environmental concerns because, for example, water-based vehicles reduce production complexity and costs related to organic vapor burn-off and/or entrapment, recovery, recycling, and associated loss risks and the like. Certain example embodiments of this invention relate to the use of "lead-free" frit slurry mixtures that include FDA approved binders and water as a solvent, thereby reducing the toxic or environmentally hazardous nature of the slurry mixture in the wet and/or dried state(s). Certain example frit slurry mixtures are capable of being pumped, extruded, or otherwise disposed using conventional equipment, either manually, semi-automatically, or automatically. In certain example embodiments, the extruded material may essentially maintain its shape as it is extruded. The as-fired product in certain example embodiments may exhibit a reduced number of bubbles or stress anomalies, while also providing adequate adhesion to the substrate. Another example aspect of certain example embodiments relates to the ability of the frit/vehicle to remain stable, as premixed pastes may be desirable in certain example applications.

Certain example embodiments of this invention relate to a frit slurry paste comprising (1) a water-based solvent; (2) a bismuth- or ceramic-based frit powder, with the frit powder being substantially free from lead; and (3) a binder comprising methylcellulose at a concentration of 0.25%-5% by weight. The frit slurry paste has a bulk viscosity of 2,000-200,000 cps.

Certain example embodiments of this invention relate to an assembly comprising at least one substrate. A frit is formed by firing a frit slurry paste applied to the at least one substrate. The frit slurry paste comprises (1) a water-based solvent; (2) a bismuth- or ceramic-based frit powder, with the frit powder being substantially free from lead; and (3) a binder comprising a gelatinous material at a concentration of 0.001%-20% by weight. The frit slurry paste has a bulk viscosity of 2,000-200,000 cps.

Certain example embodiments of this invention relate to a method of making a frit slurry paste. Frit powder, binder material, and a water-based solvent are mixed together to form an intermediate mixture. The frit powder is substantially lead free, and the water-based solvent is provided at a first temperature. Additional water-based solvent may be added to the intermediate mixture to form a frit slurry paste. The additional water-based solvent may be provided at a second temperature, with the second temperature being lower than the first temperature, e.g., to obtain the desired binder concentration (which value may be given by weight percentage in certain example instances). The binder material is provided at a concentration of 0.001%-30% by weight with respect to the frit slurry paste or the frit slurry paste absent the frit powder. The frit slurry paste has a bulk viscosity of 2,000-200,000 cps.

Certain example embodiments of this invention relate to a method of making a vacuum insulated glass (VIG) unit. A first substrate (e.g., of glass) is provided. A frit slurry paste is applied around edges of the first substrate. A second substrate (e.g., of glass) is provided such that the first and second substrates are substantially parallel and spaced apart from one another and such that the frit slurry paste is in contact with the edges of the second substrate. The frit slurry paste is fired to create an edge seal. A cavity between the first and second substrates is at least partially evacuated. The frit slurry paste has a bulk viscosity of 2,000-200,000 cps and comprises: (1) a water-based solvent, (2) a bismuth- or ceramic-based frit powder, with the frit powder being substantially free from lead, and (3) a binder comprising methylcellulose at a concentration of 0.25%-5% by weight.

Certain example embodiments of this invention relate to a method of making a frit slurry paste. A binder material and hot water are mixed together so as to at least partially dissolve the binder material in the hot water, to form an intermediate mixture. Additional water is added to the intermediate mixture to form a vehicle, with the additional water being at a temperature below a temperature of the hot water. Frit powder is added to the vehicle in making the frit slurry paste. The binder material may be provided at a concentration of 0.001%-20% by weight with respect to the frit slurry paste or the frit slurry paste absent the frit powder, and the frit slurry paste may have a bulk viscosity of 2,000-200,000 cps. The adding of the frit powder to the vehicle may comprise slow stirring to reduce the likelihood of air entrapment in the frit slurry paste.

In certain example embodiments, this frit slurry paste may be used in a method of making an assembly comprising an edge seal formed on at least one substrate. The frit slurry paste may be applied to a surface of the at least one substrate. The frit slurry paste may be at least partially dried to at least partially remove the water and form a frit bead on the surface of the at least one substrate. The frit bead may be formed on the surface of the at least one substrate so as to burn out the binder material and sinter the resulting frit in making the edge seal of the assembly.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 2:
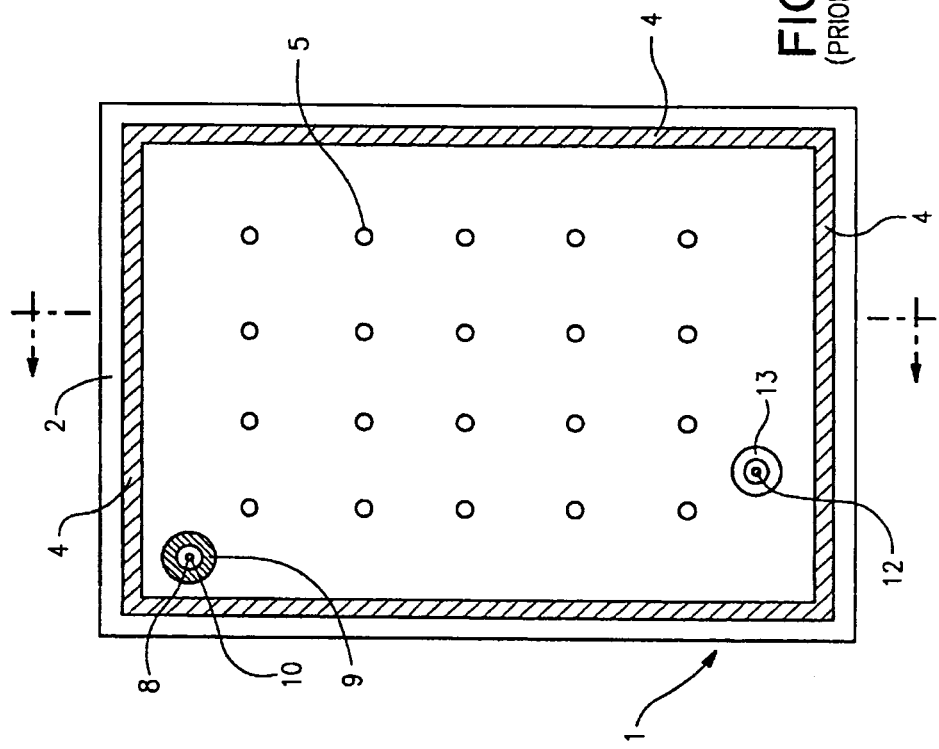
FIG. 2 is a prior art top plan view of the bottom substrate, edge seal, and spacers of the FIG. 1 vacuum IG unit taken along the section line illustrated in FIG. 1.

Certain embodiments of this invention relate to a frit slurry paste, which may be included in an assembly such as a vacuum insulated glass (VIG) unit and/or plasma display panel (PDP), or other such device that includes glass and/or metal substrates which are in contact with a fired frit. The frit slurry paste of certain example embodiments may include three major components. First, the frit slurry paste includes a frit powder. The frit powder of certain example embodiments contains bismuth (e.g., a $Bi_2O_3$—$B_2O_3$ system) and/or other ceramic compounds. The frit powder preferably is "lead-free," so as to reduce the environmental, safety, and other issues associated with the formulated paste. Second, the frit slurry paste includes a binder material. The binders of certain example embodiments comprise or consist of one or more of: methylcellulose, hydroxypropyl methylcellulose, hydroxypropyl cellulose, bentonite, laponite, or other related compounds. Third, the frit slurry paste includes a water-based solvent. Other constituents may be added to the paste of certain example embodiments. For example, in certain example embodiments, glass spheres, hollow glass spheres, and/or other inert additives may be present in the paste. See, for example, co-owned and commonly assigned Application Serial No. 12/458,111, entitled "Frit or Solder Glass Compound Including Beads, and Assemblies Incorporating the Same" filed concurrently herewith, the entire contents of which are hereby incorporated herein by reference. Surfactants also may be added to the frit slurry paste of certain example embodiments. As used herein, the term "vehicle" is used to refer to the components of the mixture, excluding the frit powder. According, in certain example embodiments, the term "vehicle" will refer to the combination of the binder material, water or water-based solvent, and any optional additives.

As explained in greater detail below, the inventors of the instant invention have determined that a methylcellulose binder in water provided the required green strength and appropriate paste properties for a frit-paste application. Paste stability and remix also were found to be acceptable. Methylcellulose is used as a food additive, and its health rating is thus understood and accepted as non-toxic. Although the drying time for a conventional amyl acetate based vehicle is about 2-3 minutes, the drying time for the water-based vehicles of certain example embodiments were only about 5-6 minutes. This drying time is acceptable in many example applications. It will be appreciated, however, that many other materials may be used as a suitable binder. Several example materials are listed below.

As is known, green strength refers to the mechanical strength that a material must have in order to withstand mechanical operations to which it is subjected after application (e.g., to a substrate) and before curing, without damaging its details. As such, green strength also refers to a material's resistance to deformation in its dried but uncured stated. It will be appreciated that, in certain example embodiments, green strength refers to the strength of the paste once it has been applied to a substrate and has been partially or fully dried, thus at least partially evaporating the water-based solvent. Greater than about 99 percent removal may be achieved in certain example embodiments. The paste, when adhered to the substrate, has a mechanical resistance to various forces that is greater than in its wet-applied form in which it flows fairly freely. The testing for green strength and adhesion described herein involved (1) the bending of a glass substrate to which the material was applied in at least two directions to determine whether there was any "detachment" or "cracking" of the material with respect to the glass, and (2) the determination as to whether and to what extent there were any deformations in the material when various forces were applied thereto.

The slurry paste mixture may be formulated so that it can be extruded onto a substrate (e.g., a glass, metal, plastic, composite, or other substrate), dried, and fired, e.g., to create a closed hermitic seal between two or more substrates. The slurry may have a bulk viscosity capable of being pumped or extruded through a nozzle, or otherwise disposed, in a specific shape (e.g., a substantially rectangular shape, a substantially circular shape, etc.) using pneumatic, hydraulic pressure, or other means, e.g., to form a predetermined profile, e.g., on a metal, glass, or other substrate. The extruded profile may be capable of being dried so that the water content is substantially completely removed therefrom so as to produce a green strength that keeps the material from crumbling, deteriorating, or being easily dislodged from the surface onto which it is applied. The green strength may be capable of fulfilling various desired functions, e.g., for processing of two panels separated by the dried slurry mixture as applied in an extrusion. Further, the exhaust gasses from the drying and firing processes may be substantially free from organic solvents or other harmful compounds.

The experimental procedure used by the inventors of the instant application to develop the water-based vehicles of certain example embodiments will now be described. Several potential rheology materials (listed below) were obtained for use as potential binders. As is known, rheology involves the study of the flow of matter. All potential binders were mixed with deionized (DI) water. Several mixtures of each were made to determine the weight concentration percentage required to obtain sufficient green strength to be practical for frit paste use. In general, binder concentrations of 0.001% to 20% will be suitable for certain example embodiments. However, binder concentrations (by weight) of 0.25-5% generally were found to be particularly advantageous, with binder concentrations (by weight) of 0.5-1.5% being yet more advantageous. Frit AGC BAS115 was used for mixing and firing, but all other tested frits acted similarly. Of course, in certain example embodiments of this invention, other non-toxic and/or "lead-free" frits may be incorporated into the mixture.

In particular, the following compounds were tested as potential binders for frits:
  Methylcellulose 400 cps 2% aqueous solution
  Methylcellulose 1600 cps 2% aqueous solution
  Methylcellulose 4000 cps 2% aqueous solution
  Methylcellulose 8000 cps 2% aqueous solution
  Hydroxypropyl methylcellulose
  Hydroxypropyl cellulose
  Bentonite H
  Laponite XL2 1
  Laponite RD The celluloses listed above were obtained from Alfa Aesar and are used in the food and makeup industries. The bentonite and laponite were obtained from Southern Clay Production and are used to modify the rheology of clay slips for making ceramics. Thus, these compounds were found to be very good in terms of health and safety (e.g., flammability, reactivity, etc.) considerations.

These water-based vehicles were compared to frit paste using amyl acetate/ethyl cellulose (with a 1.25% binder concentration). Each of the water-based systems required an added amount of water and binder solution to achieve a dispensable paste viscosity similar to that of the amyl acetate vehicle. In particular, as explained in greater detail below, the water-based vehicles of certain example embodiments were found to require about 33% or more solution to make similar dispensable paste viscosity to the amyl acetate vehicle, more preferably 40% or more, still more preferably 50% or more, and sometimes even 60-65% or more.

In terms of paste mixing characterization, it is noted that the density of amyl acetate is 0.876 gm/cm$^3$, whereas water density, at least ideally, is 1.00 gm/cm$^3$. As alluded to above, the use of water-based solvents required a weight increase in vehicle-to-frit ratio to obtain similar paste viscosities of at least 33%, more preferably at least 40%, still more preferably at least 50%, and sometimes 60-65% or more. The higher molecular weight methylcellulose 1600, 4000, and 8000 cps produced a more jelly-like consistency which generally was found to be too elastic and difficult to dispense evenly for use in certain precision applications. Of course, these and/or other similarly behaving materials may be used in a number of other applications.

At least two factors influence the increase of vehicle requirement. First, the density of water is greater than the density of amyl acetate. The 1.00/0.876 ratio suggests the need for an approximate 14% increase in weight usage based on the density difference.

Second, the surface tension of water is greater than amyl acetate, therefore suggesting that additional fluid is needed to thin it to a workable viscosity. Several methods were used to lower water surface tension. The surfactants tergitol and triton were used, as was isopropyl alcohol. However, surprisingly and unexpectedly, it was determined that reducing the surface tension of the water solution did not result in a measurable difference to the paste properties. Instead, each of the water-based systems still required an addition of at least about 35-36% more vehicle volume (about 50% total, less about 14% attributable to viscosity differences) to produce acceptable paste viscosity. The thicker methylcellulose solutions required even more volume to compensate for the jelly-like texture of the solution. Although adjustments to the surface tension did not have a measurable affect on the mixing ratio, the inventors of the instant application believe that it is possible that, apart from the difference due to density, the additional solution (sometimes an additional ~35% or more) is due to hydrogen bonding, which is very strong in water solutions.

The additional fluid influenced the binder concentration percentage requirement. Thus, as indicated above, 0.50% to 1.00% binder concentration was found to be acceptable for methylcellulose, although concentrations ranging from 0.25% to 5% also may be acceptable in certain example instances. Indeed, in certain example applications, a 0.75% methylcellulose concentration will have a sufficient green strength for rough handling. Because of the additional volume of water vehicle involved in the paste, in general, 0.75% methylcellulose corresponds to 1.125% binder in amyl acetate, 1.00% methylcellulose corresponds to 1.50% binder in amyl acetate, etc.

The methylcellulose binder had to be dissolved into the water. However, the inventors of the instant invention observed that the frit powders tended to clump and dissolve very slowly, sometimes requiring days to dissolve, even when rolling was used to speed the process. Surprisingly and unexpectedly, however, the inventors of the instant invention discovered that methylcellulose acts somewhat similarly to gelatin food products (e.g., such as Jell-o). Accordingly, the inventors of the instant invention discovered that the methylcellulose could be dissolved in the water by mixing in hot DI water and then adding cooler water to the required volume. For example, about one-half of the total volume of water could be added as hot water (e.g., in a temperature range of about 150 degrees F. to boiling, although lower temperatures, e.g., at about 100 degrees F. or lower, may be preferably in certain example instances), and then the rest of the water for the required volume could be added at a temperature at or close to the ambient or room temperature. In certain example embodiments, the temperature of the "hot" water may be decreased.

The formulated frit pastes were dispensed on microscope slides, and a second slide was placed atop the frit paste. The assembly was then fired at a temperature of 525 degrees C. for 20 minutes using a conventional heating oven. In general, frit firing temperatures may range from about 300-550 degrees C., with the firing time depending on the type of heating mechanism used. For example, conventional ovens may take longer than IR burners. In any event, the fired frits of certain example embodiments were very similar or identical in appearance to one another, with each having a dark appearance and very similar or identical binder burnout. One observed difference, however, was that the thicker, more gelatin like solutions tended to produce large air bubbles in the fired frits. Large air bubbles typically were those pockets having a diameter or with of about 1 mm (e.g., 0.7-1.3 mm), whereas minor bubbles refers to a reduction in the size and/or number of air bubbles present in the fired frit. The inventors of the instant application determined that this was associated with the paste texture being so elastic that bubbles entrapped in the paste could not move to the exterior and escape. Large air bubbles are disadvantageous from a cosmetic or aesthetic viewpoint, as the product will not have an even or uniform glass surface. Large air bubbles also are believed to be disadvantageous in that they could affect the final performance of the frit, e.g., in terms of reducing the overall adhesive strength of the frit, creating an opportunity for out-gassing, etc.

The following table summarizes the resulting properties of the various test binders.

| Binder | Green Strength | Paste Texture | Paste Remix | Firing |
|---|---|---|---|---|
| Methylcellulose 400 | Excellent (strongest tested) | Least gelatin | Excellent | Minor Bubbles |
| Methylcellulose 1600 | Excellent | More gelatin | Excellent | Large Bubbles |
| Methylcellulose 4000 | Excellent | More gelatin | Excellent | Large Bubbles |
| Methylcellulose 8000 | Excellent | Most gelatin | Excellent | Large Bubbles |
| Hydroxypropyl cellulose | Good | Normal | Excellent | Minor Bubbles |
| Hydroxypropyl methylcellulose | Good | Normal | Excellent | Minor Bubbles |

Bentonite exhibited a number of insoluble solids in the water. Laponite XL21 and RD lacked sufficient green strength for many example applications. Although the hydroxypropyl compounds were satisfactory and remixed well, the methylcellulose compounds were found to be superior to the hydroxypropyl compounds, at least in terms of green strength. It is noted that the higher viscosity methylcellulose compounds were found to be harder to dissolve in water to contain a consistent solution, and also resulted in thick and gooey pastes. The thick and viscous pastes, in turn, required additional vehicle, which made the paste elastic and sometimes hard to spread.

Accordingly, the best balance of properties was found with the 400 cps methylcellulose. Its green strength was the highest in comparison to the percentage of binder and allows a lower percentage to be used. As noted above, a 0.5% weight concentration was found to be acceptable, and 0.75% weight concentration was found to be very strong. Of course, it will be appreciated that other materials may be used including, for example, lower molecular weight methylcellulose compounds (e.g., commercially available from Aldrich Sigma).

Although the viscosity range may vary for various frit slurry pastes produced in accordance with different example embodiments, a viscosity range of 2,000-500,000 cps generally is preferable, a viscosity range of 20,000-250,000 cps being more preferable, and a viscosity range of 40,000-80,000 cps being still more preferable. The preferred 400 cps methylcellulose binder with a 0.75% weight concentration was found to produce a frit slurry pastes having a bulk viscosity of about 60,000 cps, which falls within these preferred ranges.

Certain example embodiments may provide for a frit that has a seal density of approximately 6.4 g/cm$^3$. The coefficient of thermal expansion (CTE) may be selected to match or come close to one or more of the materials to which the frit is to be applied. For example, the CTE of the frit may be selected to match that of soda lime glass, which is commonly 8 ppm, e.g., by providing a linear CTE for the frit in the range of, for instance, 7.5-9.36K×10$^{-7}$. Of course, other CTEs are possible and may be selected, e.g., in dependence on the desired application and materials to which the frit will be applied. In this regard, the CTE may be made to match a CTE that is acceptable for use with glass and/or metal substrates. Similar to the CTE, the annealing, softening, and working temperatures may be selected to match or come close to one or more of the materials to which the frit is to be applied. For example, an annealing temperature of about 350 degrees C., a softening temperature of about 400 degrees C., and a working temperature of about 470 degrees C. (for about 10 minutes) would be advantageous for use in connection with many soda lime glass applications, including VIG unit applications.

Although certain example frit slurry pastes have been described as including Frit AGC BAS115, it will be appreciated that any suitable frit may be used. For example, any suitable "lead-free" frit may be used. It will be appreciated that a frit may include some amount of lead and still be considered "lead free." For example, a frit may include several PPM lead and still be said to be "lead free." In general, a "lead-free" frit will be any frit that has an amount of lead below a toxic threshold. Similarly, although certain example frit slurry pastes have been described as including celluloses, other binder materials may be used in connection with different example embodiments. Such binders may include gelatins or gelatinous substances. For example, amyl acetate and ethyl cellulose (0.75-1.25% by weight), amyl acetate and nitrocellulose (0.75-1.25% by weight), and the like, also may be used in connection with certain example embodiments. Furthermore, other additives may be included such as, for example, surfactants, colorants, etc., so as to achieve the desired properties of the frit slurry paste and/or fired frit.

Figure 1:
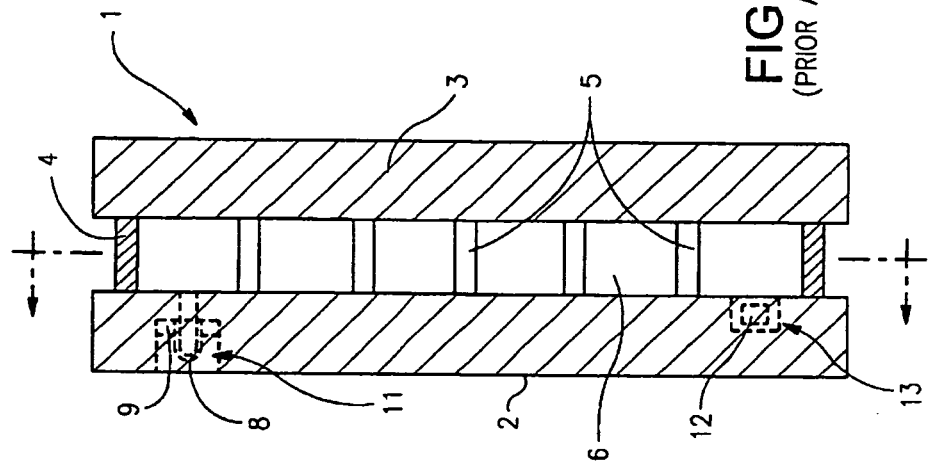
FIG. 1 is a prior art cross-sectional view of a conventional vacuum IG unit.
Figure 3:
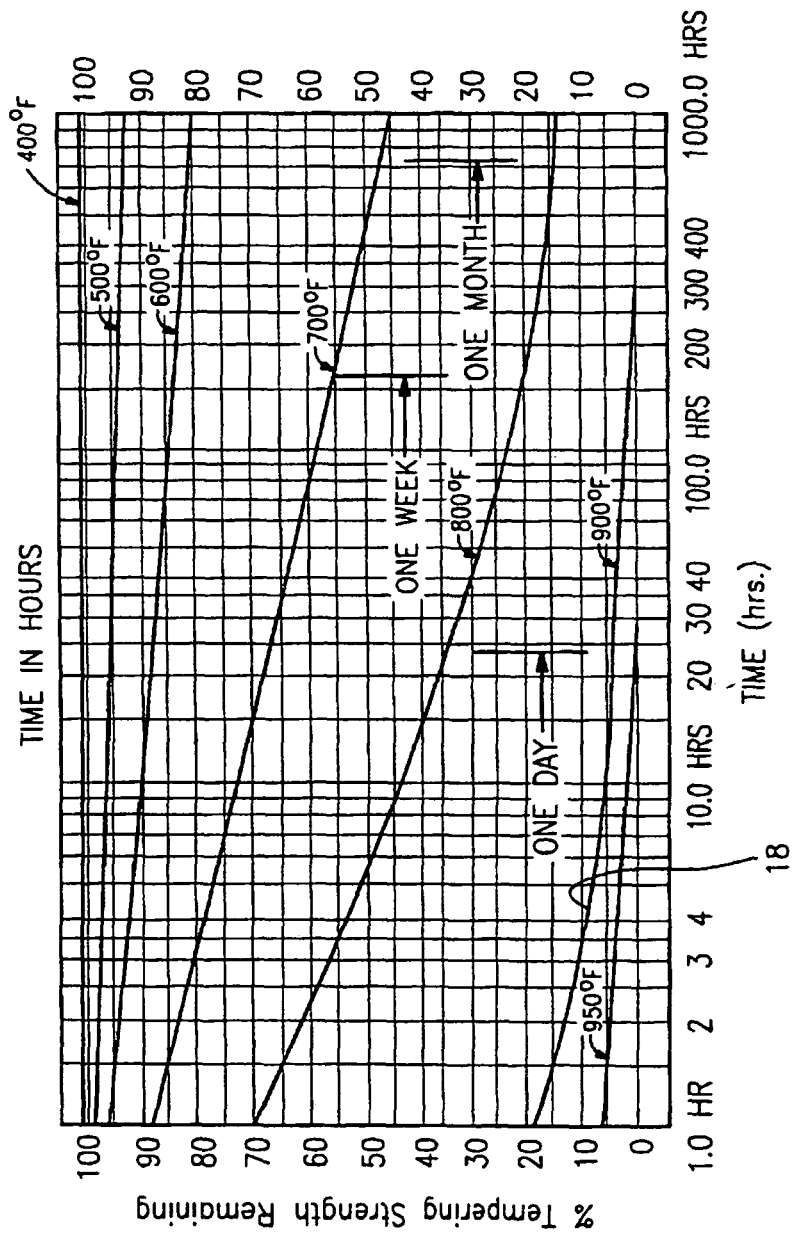
FIG. 3 is a graph correlating time (hours) versus percent tempering strength remaining, illustrating the loss of original temper strength for a thermally tempered sheet of glass after exposure to different temperatures for different periods of time.
Figure 4:
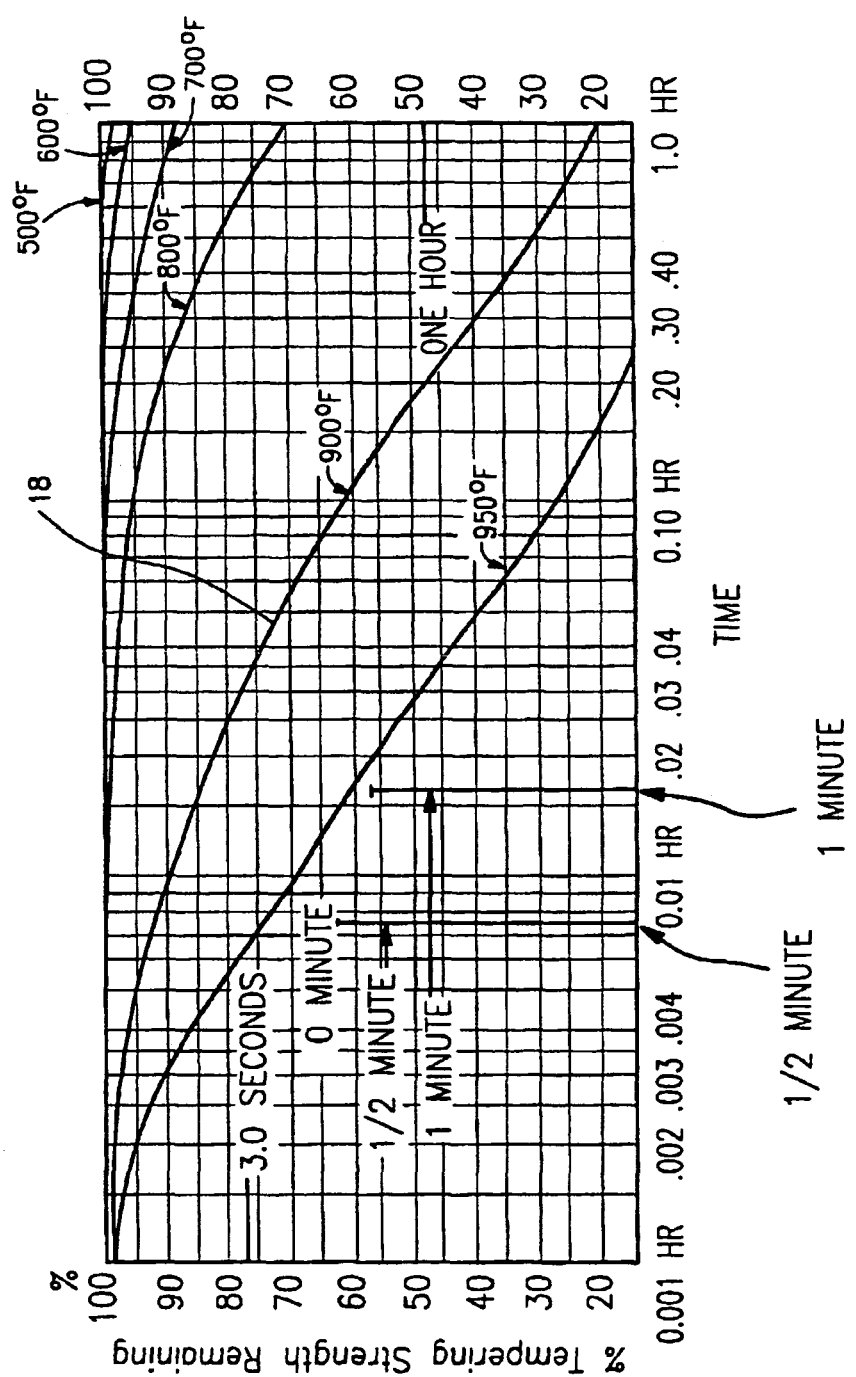
FIG. 4 is a graph correlating time versus percent tempering strength remaining similar to that of FIG. 3, except that a smaller time period is provided on the x-axis.
Figure 5:
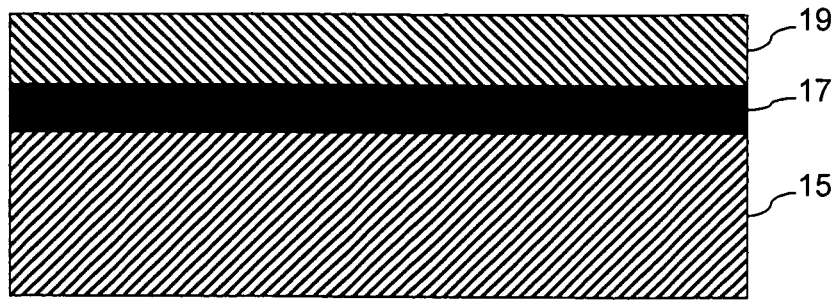
FIG. 5 is an assembly incorporating a frit in accordance with an example embodiment.

The frit slurry paste may be applied in place of the fused solder glass peripheral seals 4 shown in, and discussed in connection with, FIGS. 1 and 2, e.g., for VIG unit applications. Similarly, the frit slurry paste may be used in PDP applications, e.g., between two glass substrate, between a glass substrate and a metal layer or connector. In general, as shown in FIG. 5, the frit slurry paste 17 may be applied and fired as a frit between any two surfaces, whether those surfaces are for glass substrates, metal layers, traces, connectors, and/or the like.

Figure 6:
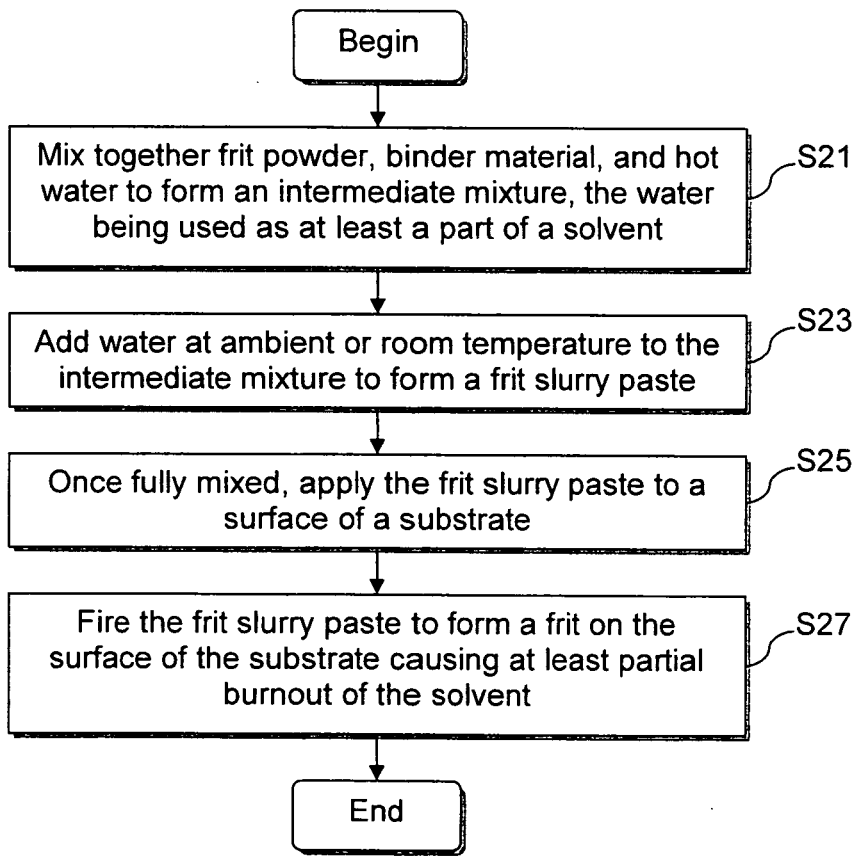
FIG. 6 is a flowchart illustrating an example process for making a frit slurry paste and applying it to a substrate in accordance with an example embodiment.

FIG. 6 is a flowchart illustrating an example process for making a frit slurry paste and applying it to a substrate in accordance with an example embodiment. In step S21, frit powder, binder material, and hot water are mixed together to form an intermediate mixture. The frit powder may be a "lead-free" frit powder, and the binder may be any environmentally friendly (e.g., hydrocarbon free) gelatin or gelatinous material such as, for example, a cellulose material. The water is used as at least a part of a solvent. In step S23, additional water is added to the intermediate mixture to form a frit slurry paste. The water in step S21 is at a temperature higher than the water added in step S23. For example, the water in step S21 may be at or close to boiling, whereas the water in step S23 may be at or close at ambient or room temperature. Once mixed, the frit slurry paste may be applied to a surface of a substrate in step S25. The frit slurry paste may be fired in step S27 to form a frit on the surface of the substrate. The firing in step S27 may cause at least partial burnout of the water-based solvent. Optionally, in a step not shown, another substrate may be provided over the frit or frit slurry paste, e.g., in making a VIG unit or PDP.

Figure 7:
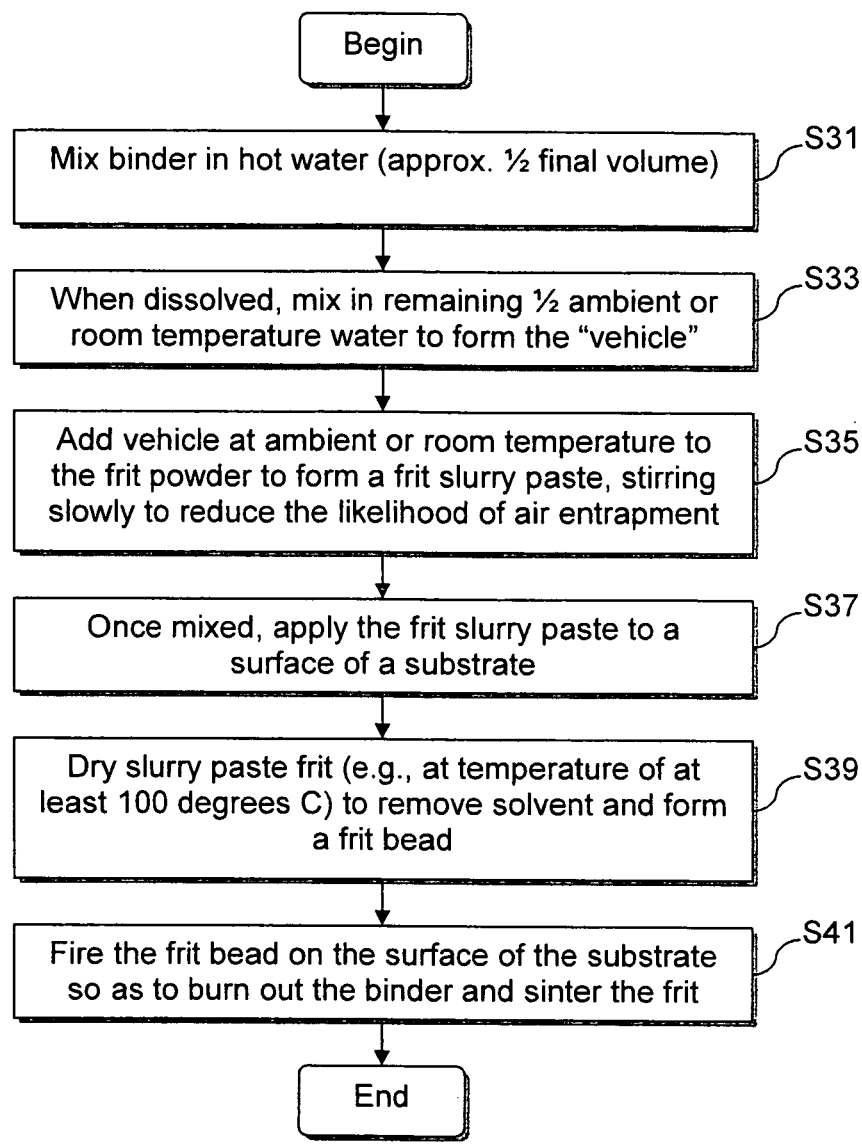
FIG. 7 is a flowchart illustrating another example process for making a frit slurry paste and applying it to a substrate in accordance with an example embodiment.

FIG. 7 is a flowchart illustrating another example process for making a frit slurry paste and applying it to a substrate in accordance with an example embodiment. In step S31, binder material and hot water are mixed together. The amount of hot water used in this step may equal about one-half of the total volume of water to be added, and the "hot" water may be provided, for example, temperature ranges identified above. In step S33, once the binder is partially or fully dissolved in the hot water, the rest of the water comprising the volume is mixed in, e.g., at or close to ambient or room temperature, to form the vehicle. The vehicle is added to the frit powder in step S35 to form a frit slurry paste. The mixture is stirred slowly to reduce the likelihood of air entrapment in the slurry paste. The vehicle may be at ambient or room temperature when it is added to the frit powder. In any event, following the mixing, in step S37, the frit slurry paste is applied to a surface of a substrate. The frit slurry paste is dried (e.g., at a temperature of at least 100 degrees C.) in step S39. This helps remove the water-based solvent from the slurry paste and forms a frit bead. In step S41, the frit bead on the surface of the substrate is fired. This helps burn out the binder material and sinters the frit.

"Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates. Also, while a component may be said to be "on" or "supported" by one or more of the substrates herein, this does not mean that the component must directly contact the substrate(s). In other words, the word "on" covers both directly and indirectly on, so that the component may be considered "on" a substrate even if other material (e.g., a coating and/or thin film) is provided between the substrate and the component.

It will be appreciated that the example embodiments described herein may be used in connection with a variety of different VIG assembly and/or other units or components. For example, the substrates may be glass substrates, heat strengthened substrates, tempered substrates, etc.

The terms "heat treatment" and "heat treating" as used herein mean heating the article to a temperature sufficient to enabling thermal tempering, bending, and/or heat strengthening of the glass. This includes, for example, heating an article to a temperature of at least about 580 or 600 degrees C. for a sufficient period to enable tempering and/or heat strengthening, more preferably at least about 600 degrees C., and sometimes to 625 degrees C. In some instances, the HT may be for at least about 4 or 5 minutes.

It is noted that the glass substrate(s) may be heat treated in certain example embodiments so that the glass substrate(s) is/are either heat strengthened or thermally tempered (e.g., at a temperature of at least about 580 degrees C., more preferably at least about 600 degrees C., and often at least about 620 or 640 degrees C.).

Certain example embodiments may provide localized heating to and/or IR heating of the frits as disclosed in, for example, application Ser. Nos. 12/000,663 and 12/000,791, the entire contents of each which are hereby incorporated herein by reference. This may be facilitated by designing the frit of certain example embodiments to absorb infrared, e.g., in the 800-2000 nm regions (or any sub-regions therein). This may be accomplished, for example, by providing additives that will absorb these wavelengths. These additives may be provided at various times including, for example, during the batch recipe of the frit and melted into the glass frit, added as powder to the base powdered frit, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulated glass (VIG) unit, the method comprising:
   providing a first substrate;
   applying a frit slurry paste around edges of the first substrate;
   providing a second substrate such that the first and second substrates are substantially parallel and spaced apart from one another and such that the frit slurry paste is provided around edges of the second substrate;
   firing the frit slurry paste to create an edge seal; and
   at least partially evacuating a cavity formed between the first and second substrates,
   wherein the frit slurry paste has a bulk viscosity of 20,000-100,000 cps and comprises:
      a water-based solvent,
      a frit powder comprising bismuth, the frit powder being substantially free from lead, and
      a binder comprising methylcellulose at a concentration of 0.25%-5% by weight, and
   wherein the frit slurry paste has annealing, softening, and working temperatures less than about 470 degrees C. and that all lie within a range of about 120 degrees C. of one another.

2. The method of claim 1, wherein the frit slurry paste is extruded onto at least the first substrate.

3. The method of claim 1, wherein the frit powder comprises $Bi_2O_3$—$B_2O_3$.

4. The method of claim 1, wherein the frit slurry paste further comprising non-lead additives capable of absorbing 800-2,000 nm infrared radiation.

5. The method of claim 1, wherein the binder is methylcellulose 400 cps 2% aqueous solution.

6. The method of claim 1, wherein the frit powder further comprises other ceramic.

7. The method of claim 1, wherein the frit powder consists essentially of oxide of bismuth.

8. The method of claim 1, wherein the frit powder consists essentially of $Bi_2O_3$—$B_2O_3$.

9. A method of making a vacuum insulated glass (VIG) window unit, the method comprising:
   providing a first transparent substrate;
   applying a frit slurry paste on the first transparent substrate;
   providing a second transparent substrate such that the first and second substrates for the VIG window unit are substantially parallel and spaced apart from each other and such that the frit slurry paste is provided between at least the first and second substrates;
   firing the frit slurry paste to create an edge seal that encompasses a cavity between the substrates; and
   at least partially evacuating the cavity formed between the first and second substrates,
   wherein the frit slurry paste comprises:
      a water-based solvent,
      a frit powder comprising bismuth, the frit powder being substantially free from lead, and
      a binder comprising methylcellulose at a concentration of 0.25%-5% by weight, and
   wherein the edge seal has a coefficient of thermal expansion (CTE) of $7.5$-$9.36 \times 10^{-7}$ K.

10. The method of claim 9, wherein a low-E coating is provided on the first substrate.

11. The method of claim 9, wherein the frit powder comprises $Bi_2O_3$—$B_2O_3$.

12. The method of claim 9, wherein the frit slurry paste further comprises non-lead additives capable of absorbing 800-2,000 nm infrared radiation.

13. The method of claim 9, wherein the frit powder consists essentially of $Bi_2O_3$—$B_2O_3$.

14. The method of claim 1, wherein the edge seal has a coefficient of thermal expansion (CTE) of $7.5$-$9.36 \times 10^{-7}$ K.

15. The method of claim 9, wherein the frit slurry paste has annealing, softening, and working temperatures less than about 470 degrees C. and that all lie within a range of about 120 degrees C. of one another, the annealing, softening, and working temperatures of the frit slurry paste being selected to substantially match respective properties for the substrates the edge seal contacts, post firing.

* * * * *